(12) United States Patent
Armendariz

(10) Patent No.: US 11,846,357 B2
(45) Date of Patent: Dec. 19, 2023

(54) SAFETY FLOW OBSTRUCTION HOLDER

(71) Applicant: Gerardo Armendariz, Midland, TX (US)

(72) Inventor: Gerardo Armendariz, Midland, TX (US)

(*) Notice: Subject to any disclaimer, the term of this patent is extended or adjusted under 35 U.S.C. 154(b) by 34 days.

(21) Appl. No.: 14/791,415

(22) Filed: Jul. 4, 2015

(65) Prior Publication Data
US 2017/0002935 A1   Jan. 5, 2017

(51) Int. Cl.
*F16K 11/056* (2006.01)
*B65D 88/54* (2006.01)
*B67D 7/02* (2010.01)
*B67D 7/78* (2010.01)

(52) U.S. Cl.
CPC ............ *F16K 11/056* (2013.01); *B65D 88/54* (2013.01); *B67D 7/02* (2013.01); *B67D 7/78* (2013.01)

(58) Field of Classification Search
CPC .................. F16K 11/056; B65D 88/54; Y10T 137/86903; Y10T 137/87096; Y10T 137/87105; Y10T 137/87273; Y10T 137/87281; Y10T 137/87555; Y10T 137/87571; Y10T 137/598; Y10T 137/6969
See application file for complete search history.

(56) References Cited

U.S. PATENT DOCUMENTS

| | | | | |
|---|---|---|---|---|
| 395,673 A * | 1/1889 | Vernon | ..................... | B61G 5/08 137/349 |
| 3,299,661 A * | 1/1967 | Ayling | ..................... | F25B 13/00 137/112 |
| 3,463,389 A * | 8/1969 | Mott | ......................... | F15C 3/06 137/119.06 |
| 3,768,500 A * | 10/1973 | Kauer, Jr. | .......... | B01D 53/0446 235/201 ME |
| 3,780,757 A * | 12/1973 | Jordan | ....................... | E03F 1/00 4/321 |
| 3,900,230 A * | 8/1975 | Durling | .................. | B60T 11/326 128/205.15 |
| 4,162,146 A * | 7/1979 | Seibert | .................... | B01D 53/04 96/113 |
| 4,316,557 A * | 2/1982 | Benoun | ................. | B67D 1/0004 137/614.05 |
| 5,358,009 A * | 10/1994 | Cambell | ................. | B67D 7/002 137/209 |
| 5,967,191 A * | 10/1999 | Mummolo | .......... | F16L 55/1608 137/15.09 |
| 6,510,999 B1* | 1/2003 | Yang | ...................... | F16K 11/052 137/202 |
| 2002/0134430 A1* | 9/2002 | Babcock | ............... | F16L 55/134 137/315.01 |

* cited by examiner

*Primary Examiner* — Jessica Cahill
(74) *Attorney, Agent, or Firm* — Wilson Daniel Swayze, Jr.

(57) ABSTRACT

A safety flow obstruction holder is for connecting to a tank for storing a liquid.

7 Claims, 16 Drawing Sheets

SAFETY FLOW OBSTRUCTION HOLDER

FIELD OF THE INVENTION

The present invention relates to a safety flow obstruction holder.

BACKGROUND

There are a large number of large tanks which may be filled with fluid such as contaminated water, oil or other such types of fluids. These tanks are usually controlled by shutoff valves and may include clamps and gaskets. These devices may over time become defective resulting in the contaminated fluid flowing from the tank, requiring that these devices be replaced. Previously it was necessary to drain the tank completely in order to replace the defective device. A truck may be required to be filled from the tank in order to replace the defective device.

This procedure may be expensive in terms of manpower and loss of use of the tank. These tanks may hold in excess 10,000 gallons of fluid. FIG. 12 illustrates the apparatus used without the present invention.

FIG. 12 illustrates a storage tank 103 which may be connected to a connecting passageway 1209 which may be connected to a single shutoff valve 1207. When this single shutoff valve 1207 is replaced, the entire contents of the storage tank 103 must be transferred to the oil truck 1209 through a shutoff valve 1211.

SUMMARY

A safety flow obstruction holder for connecting to a tank for storing a liquid may include a supply passageway for connecting to the tank; a ball valve for connecting to the supply passageway; a first drainage passageway for connecting to the ball valve; a second drainage passageway for connecting to the ball valve and being connected in parallel to the first drainage passageway; a connecting passageway to connect the first drainage passageway to the second drainage passageway; a first shut off valve to selectively shut off the first drainage passageway; and a second shutoff valve to selectively shut off the second drainage passageway.

The safety flow obstruction holder may include a third shutoff valve positioned within the first passageway.

The safety flow obstruction holder may be connected to a dwelling.

The safety flow obstruction holder may be connected to a oil tank.

The safety flow obstruction holder may be connected to a water tank.

The safety flow obstruction holder may be connected to a water tank and an oil tank.

The safety flow obstruction holder may be connected to a oil heater.

The safety flow obstruction holder may be connected to a toilet.

The safety flow obstruction holder may be connected to a kitchen sink.

The safety flow obstruction holder may be connected to a bathroom sink.

The safety flow structure holder may be connected to a water meter.

The safety flow obstruction holder may be connected to a pressurized water line for easy shut off valve replacement.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

The present invention stops or reduces the flow of fluids including but not limited to water, oil, gas which may be stored in large or big tanks in order to safely and effectively remove leaking, damaged or broken connecting parts and shutoff valves. The present invention does not require that the fluids the emptied out from the tanks. The present invention saves time, money, avoids waiting periods when trucks are not available, prevents unexpected accidents while working around tanks. In some situations, a significant amount of work time can be saved by using the present invention for just a few minutes. The present invention stops or controls the flow of fluids that flow out from two or more different connected flow lines with two or more shutoff valves to safely remove damaged devices or shutoff valves without having to completely remove the fluid from the tank.

Figure 12:
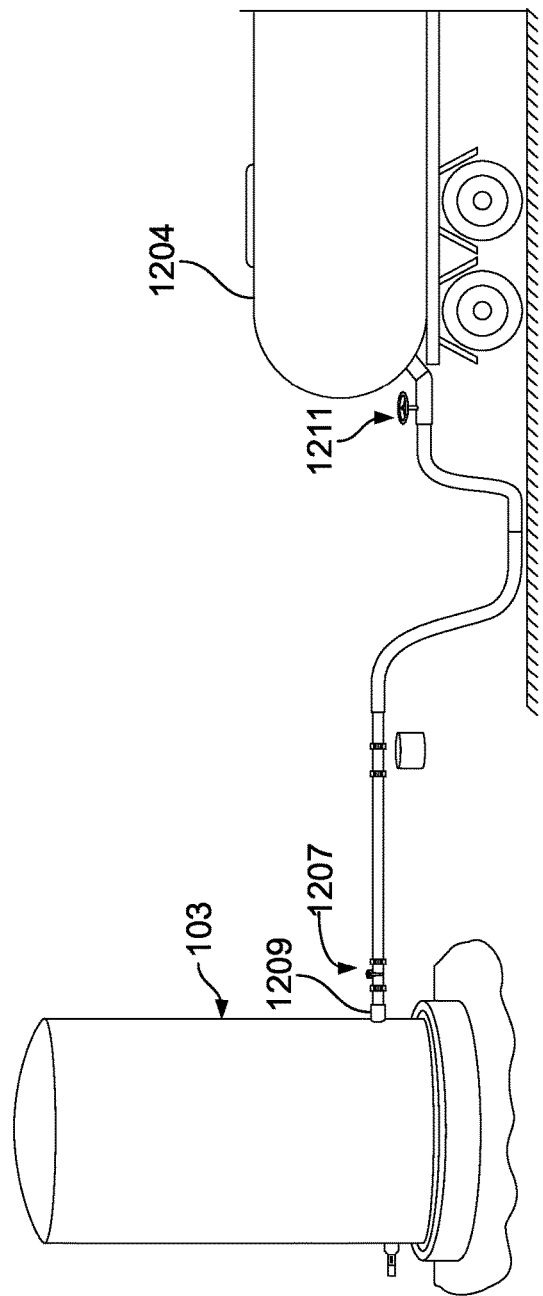
FIG. 12 illustrates a perspective view of the prior art.
Figure 13:
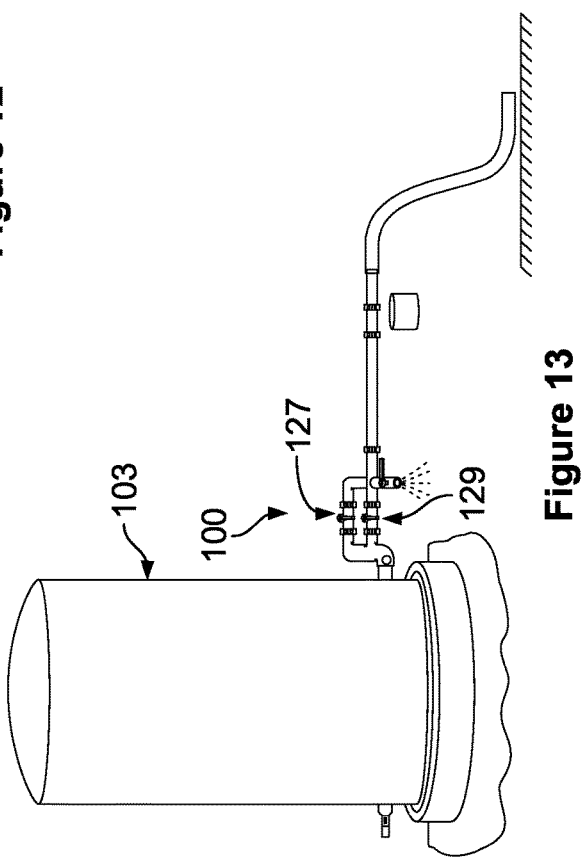
FIG. 13 illustrates a perspective view of the present invention.

In contrast to FIG. 12, FIG. 13 illustrates the safety flow obstruction holder 100 connected to the tank 103, showing that the shut off valves 127, 129, clamps and or connecting pipes may be replaced without the need to drain the tank 103 into the oil truck or other reservoir.

Figure 1:
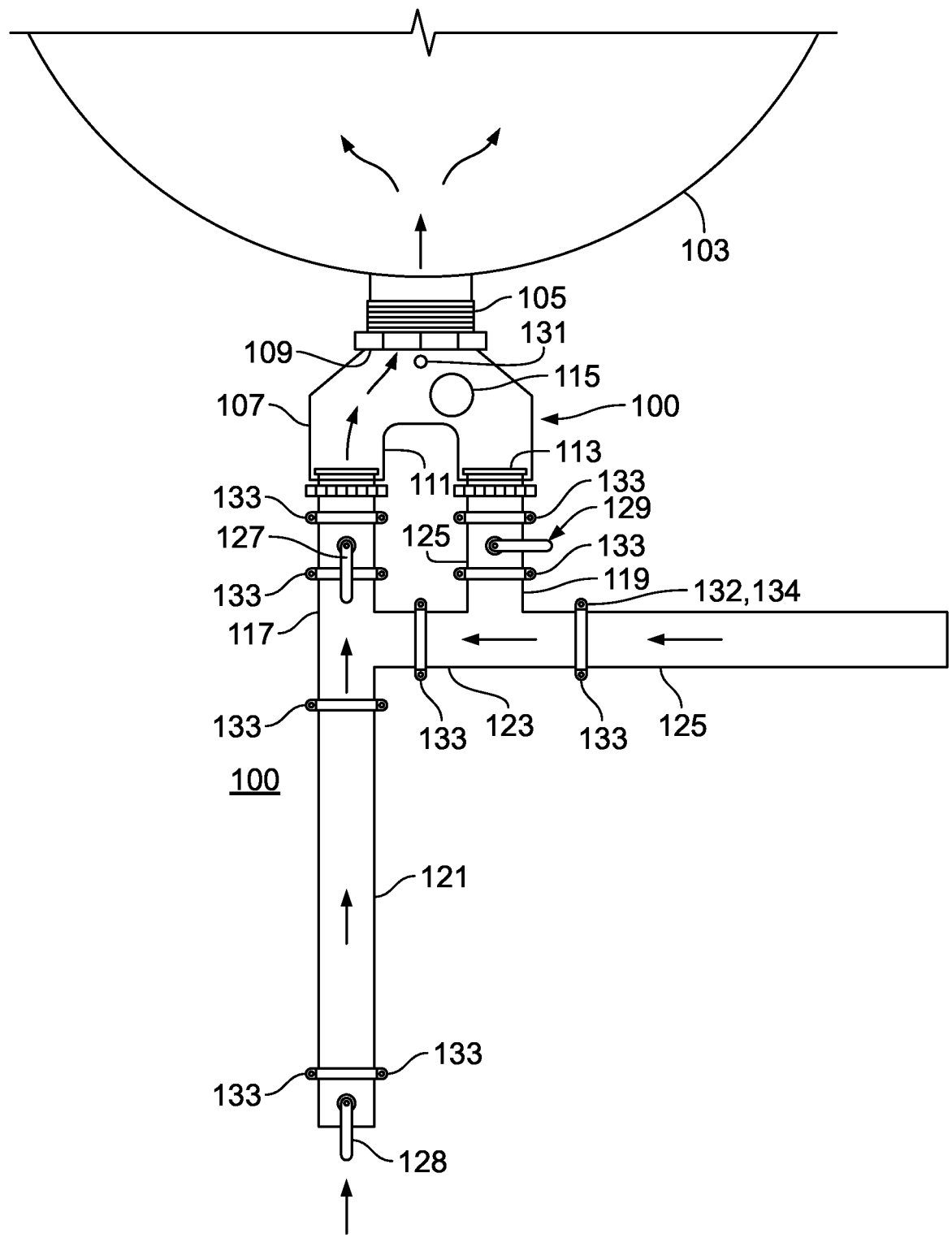
FIG. 1 illustrates a top cross-sectional view of the holder of the present invention.

FIG. 1 illustrates a top cross-sectional view of the present invention and illustrates that the safety flow obstruction holder 100 may include a tank/source 103 to hold/retained fluid which may be water, oil or other types of fluid which may be connected to a supply passageway 105 to allow the fluid to drain or enter the tank 103. The supply passageway 105 may be connected to a ball valve 107 which may include a receiving port 109 and may include a first discharging port 111 and second discharging port 113. In the term discharging and receiving port are only relative. The ball valve 107 may include a control ball 115 to direct the flow of the fluid. The first discharge port 111 may be connected to a first passageway 117, and the second discharge port 113 may be connected to a second passageway 117. The first passageway 117 and the second passageway 119 may allow the fluid to flow away from or towards the tank 103. The first passageway 109 may be connected to a first drainage passageway 121 and may be connected to a connecting passageway 123, and the second passageway 119 may be connected to the connecting passageway 123 and may be connected to the second drain passageway 125.

The first passageway 117 may include a first shut off valve 127 to open and close the first passageway 117, and the second passageway 119 may include a second shutoff valve 129 to open and close the second passageway 119. Additionally, the first drain passageway 121 may include a third shutoff valve 128.

FIG. 1 additionally illustrates a retaining finger 131 to prevent the control ball 115 from entering the receiving port 109.

FIG. 1 illustrates that the first shut off valve 127 and the third shutoff valve 128 is open allowing fluid to flow to the tank 113 with the second shutoff valve 129 being closed.

The connection between the various passageways may include a gasket 132 mounted on a bushing 134, and the various describe passageways may include a Victaulic (clamp) 133 with a gasket.

Figure 2:
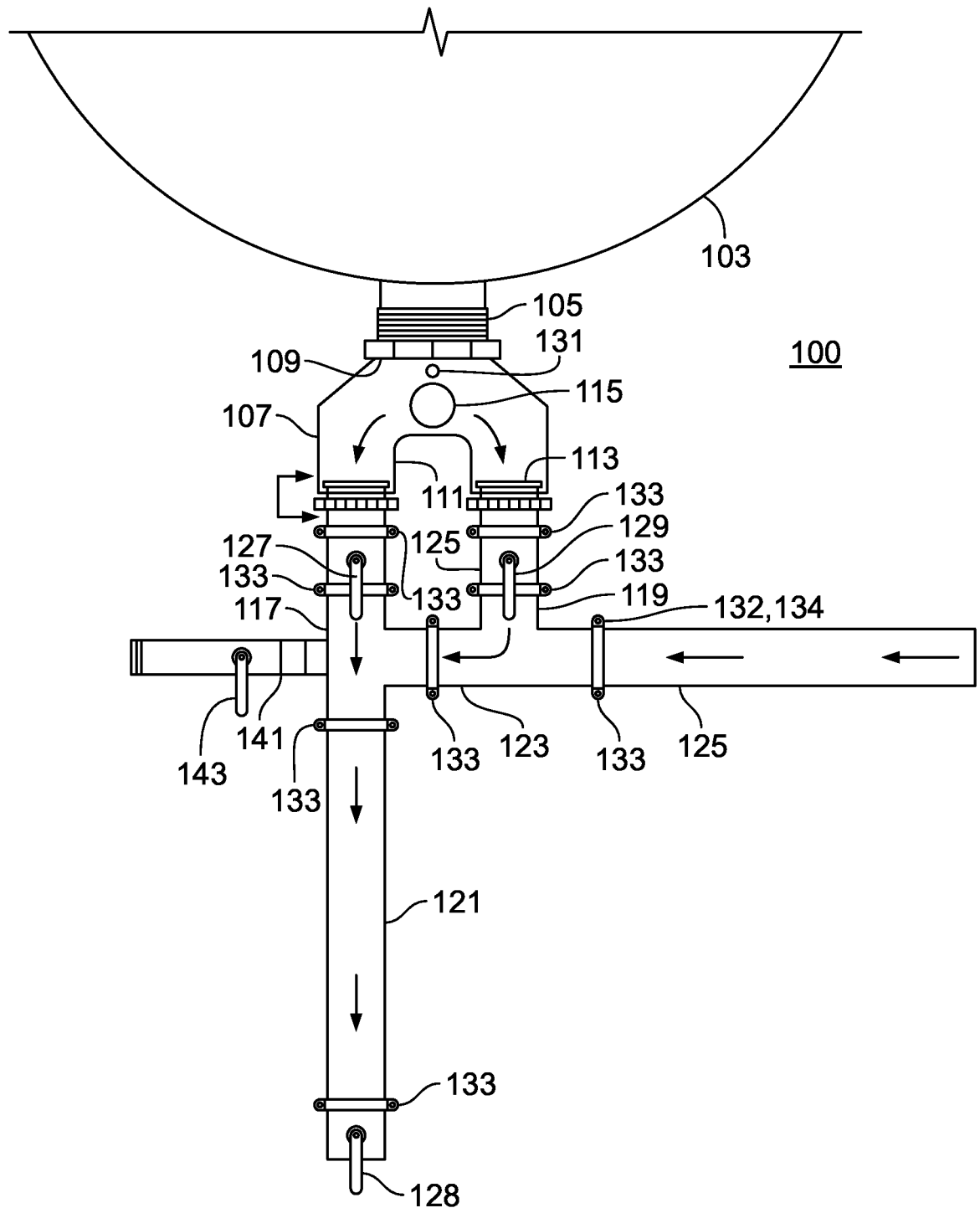
FIG. 2 illustrates another top cross-sectional view of the holder of the present invention

FIG. 2 illustrates a top cross-sectional view of the present invention and illustrates that the safety flow obstruction holder 100 may include a tank/source 103 to hold/retained fluid which may be water, oil or other types of fluid which may be connected to a supply passageway 105 to allow the fluid to drain or enter the tank 103. The supply passageway 105 may be connected to a ball valve 107 which may include a receiving port 109 and may include a first discharging port 111 and second discharging port 113. In the term discharging and receiving port are only relative. The ball valve 107 may include a control ball 115 to direct the flow of the fluid. The first discharge port 111 may be connected to a first passageway 117, and the second discharge port 113 may be connected to a second passageway 117. The first passageway 117 and the second passageway 119 may allow the fluid to flow away from or towards the tank 103. The first passageway 109 may be connected to a first drainage passageway 121 and may be connected to a connecting passageway 123, and the second passageway 119 may be connected to the connecting passageway 123 and may be connected to the second drain passageway 125.

The first passageway 117 may include a first shut off valve 127 to open and close the first passageway 117, and the second passageway 119 may include a second shutoff valve 129 to open and close the second passageway 119. Additionally, the first drain passageway 121 may include a third shutoff valve 128.

FIG. 2 additionally illustrates a retaining finger 131 to prevent the control ball 115 from entering the receiving port 109.

FIG. 2 illustrates that the first shut off valve 127, the second shutoff valve 129 and the third shutoff valve 128 is open allowing fluid to flow from the tank 113.

The connection between the various passageways may include a gasket mounted on a bushing, and the various describe passageways may include a Victaulic (clamp) 133 with a gasket.

The first drain passageway 121 may be connected to a drain 141 which extends from the first drain passageway 121 and which may include a drain show off valve 143.

FIGS. 3-10 illustrate the use of the present invention to replace a valve or other defective device. For sake of illustration, the first shut off valve 121 is assumed to be defective, but the same general procedure would be employed regardless of which device was defective.

Figure 3:
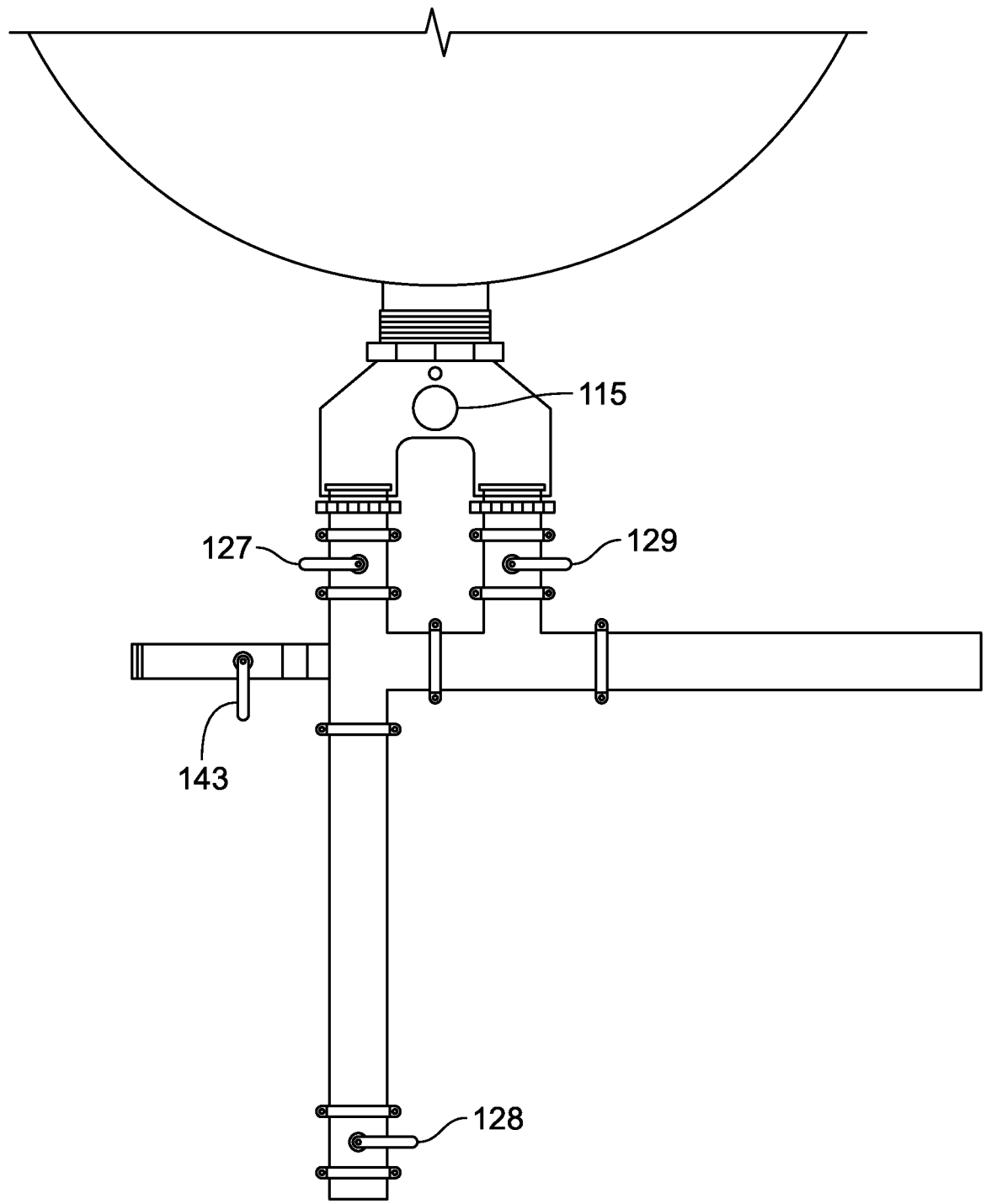
FIG. 3 illustrates a first step of the holder of the present invention.

FIG. 3 illustrates the first step and illustrates that the shut off valve 127, the shut off valve 129, the shut off valve 128 and the shut off valve 143 are positioned to close off the respective passageways.

Figure 4:
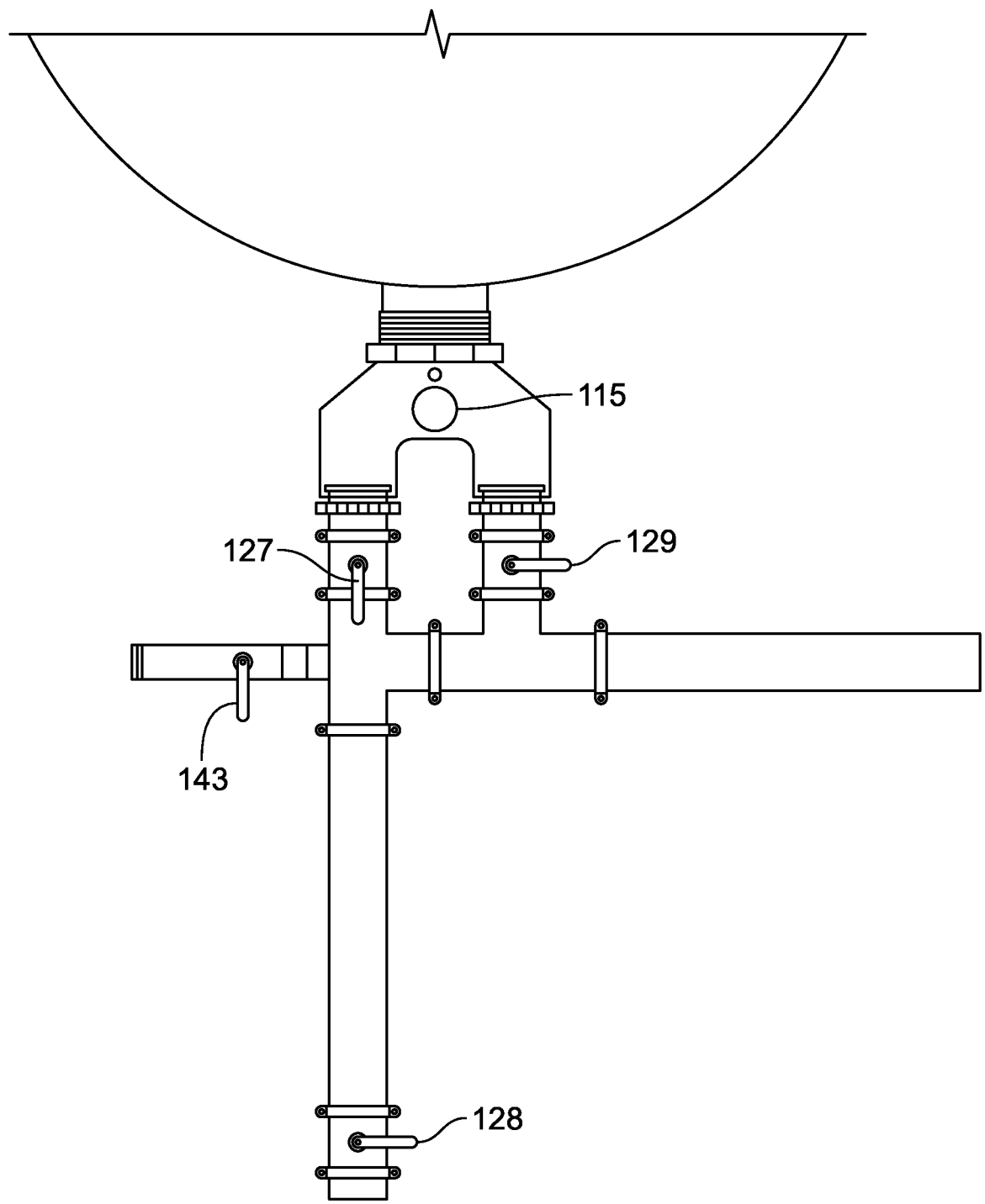
FIG. 4 illustrates a second step of the holder of the present invention.

FIG. 4 illustrates the second step and illustrates that the first shut off valve 127 and the drain shutoff valve 143 are opened in order to drain off a small amount of fluid.

Figure 5:
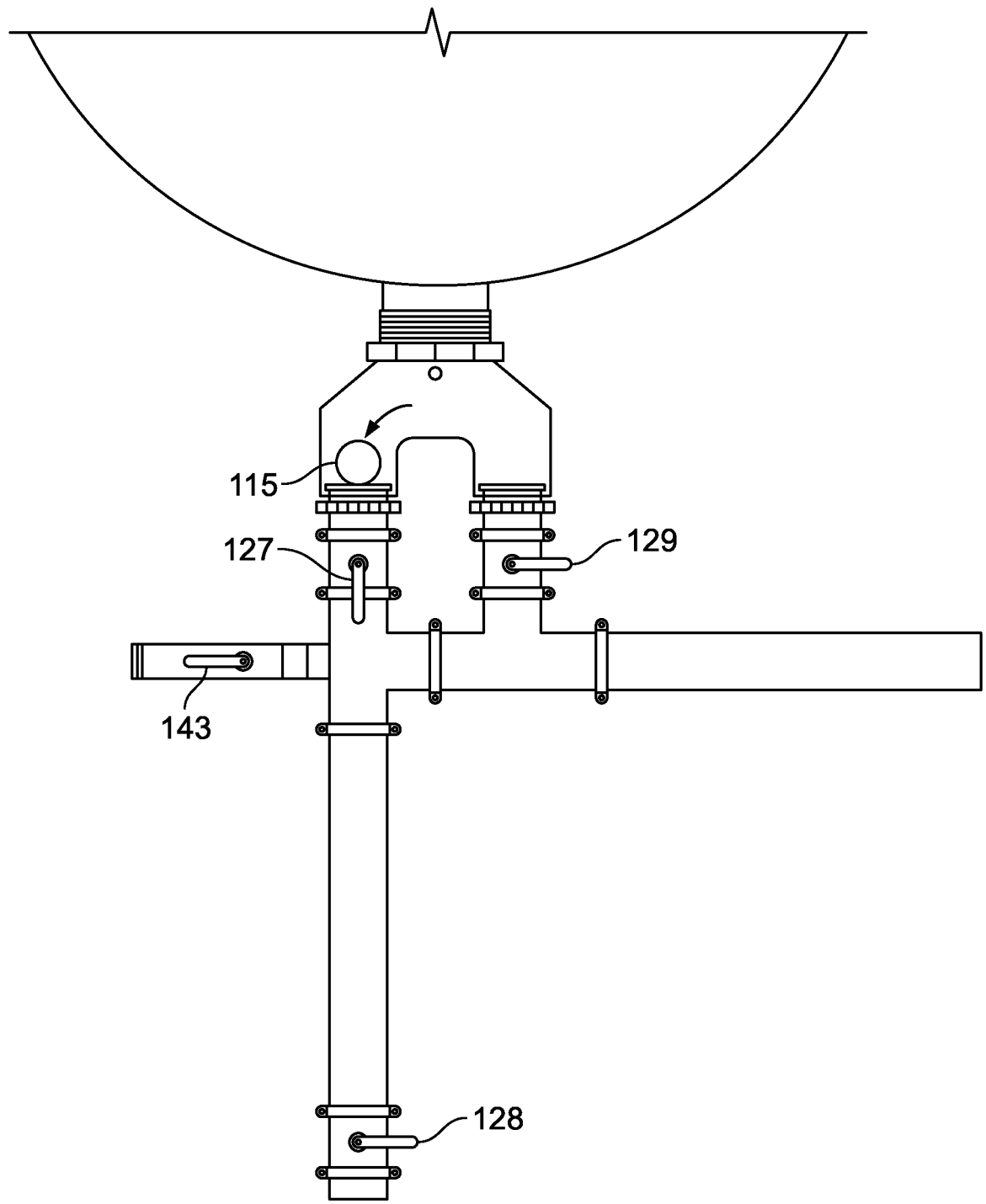
FIG. 5 illustrates a third step of the holder of the present invention.

FIG. 5 illustrates the third step and illustrates that the control ball moves to close the first port 111 and to close off the first drain passageway 121.

Figure 6:
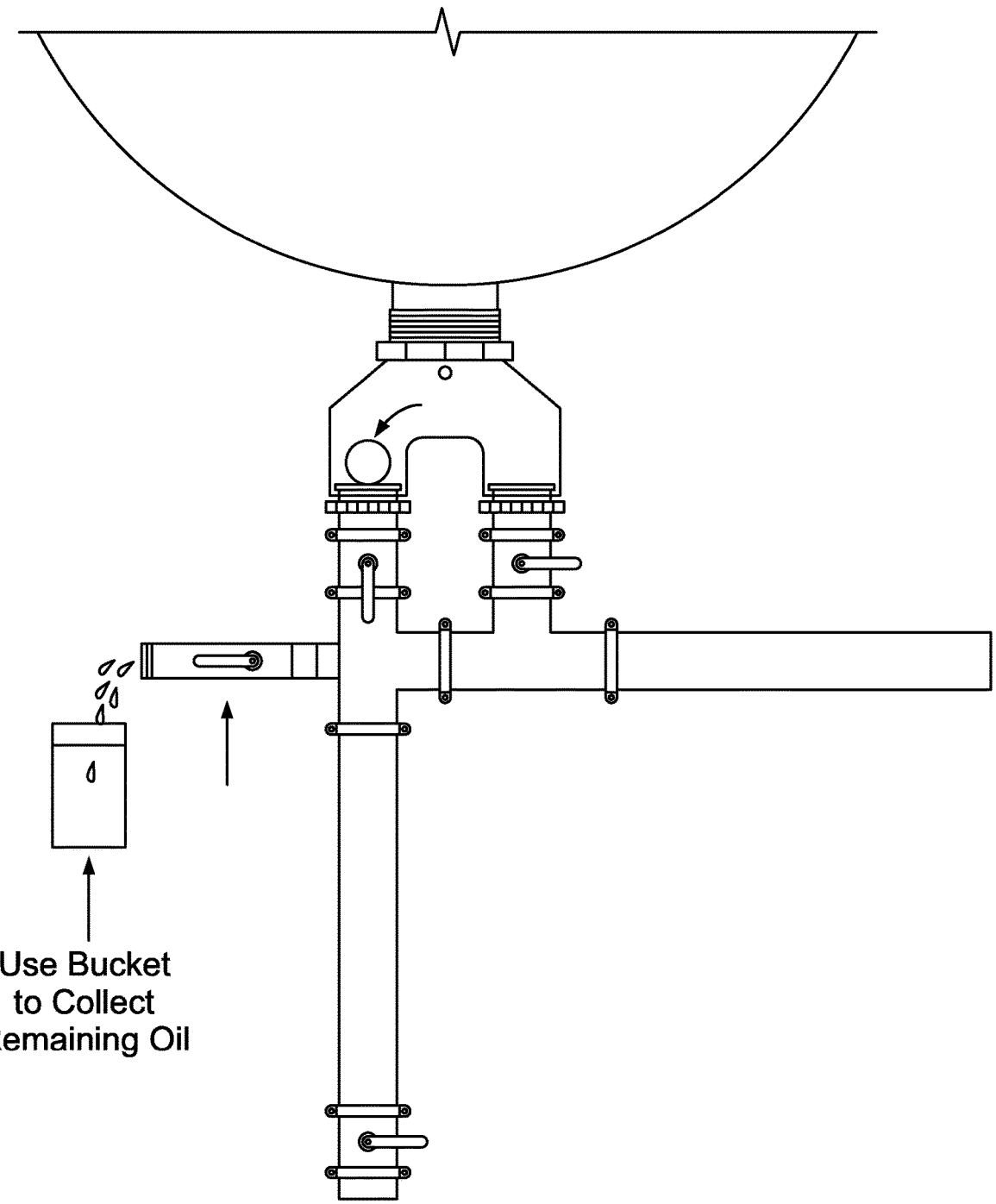
FIG. 6 illustrates a fourth step of the holder of the present invention.

FIG. 6 illustrates the fourth step and illustrates that the small amount of fluid which has escaped from the drain 141 is recovered.

Figure 7:
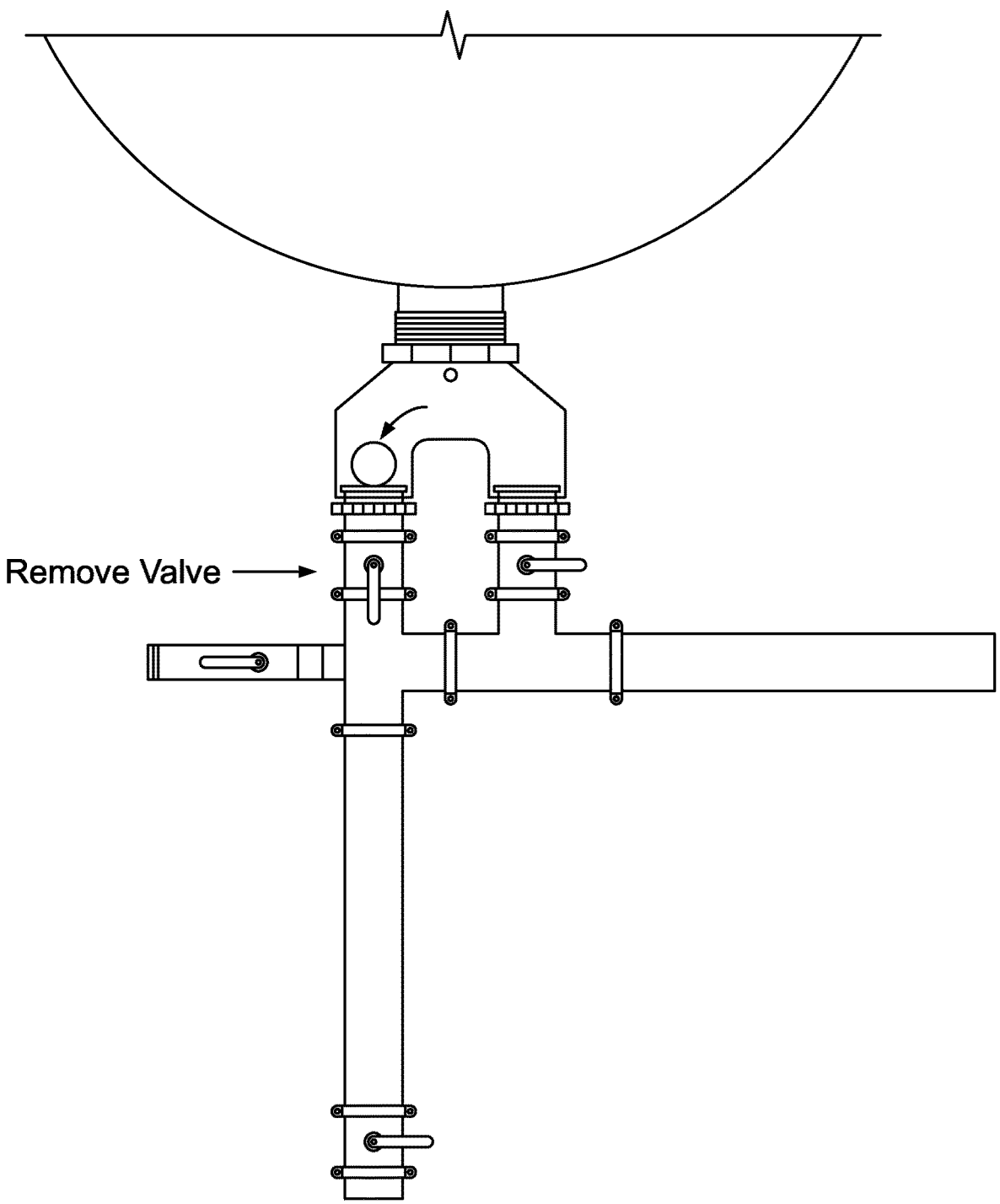
FIG. 7 illustrates a fifth step of the holder of the present invention.

FIG. 7 illustrates the fifth step and illustrates that the first shut off valve 127 is removed without additional fluid being lost.

Figure 8:
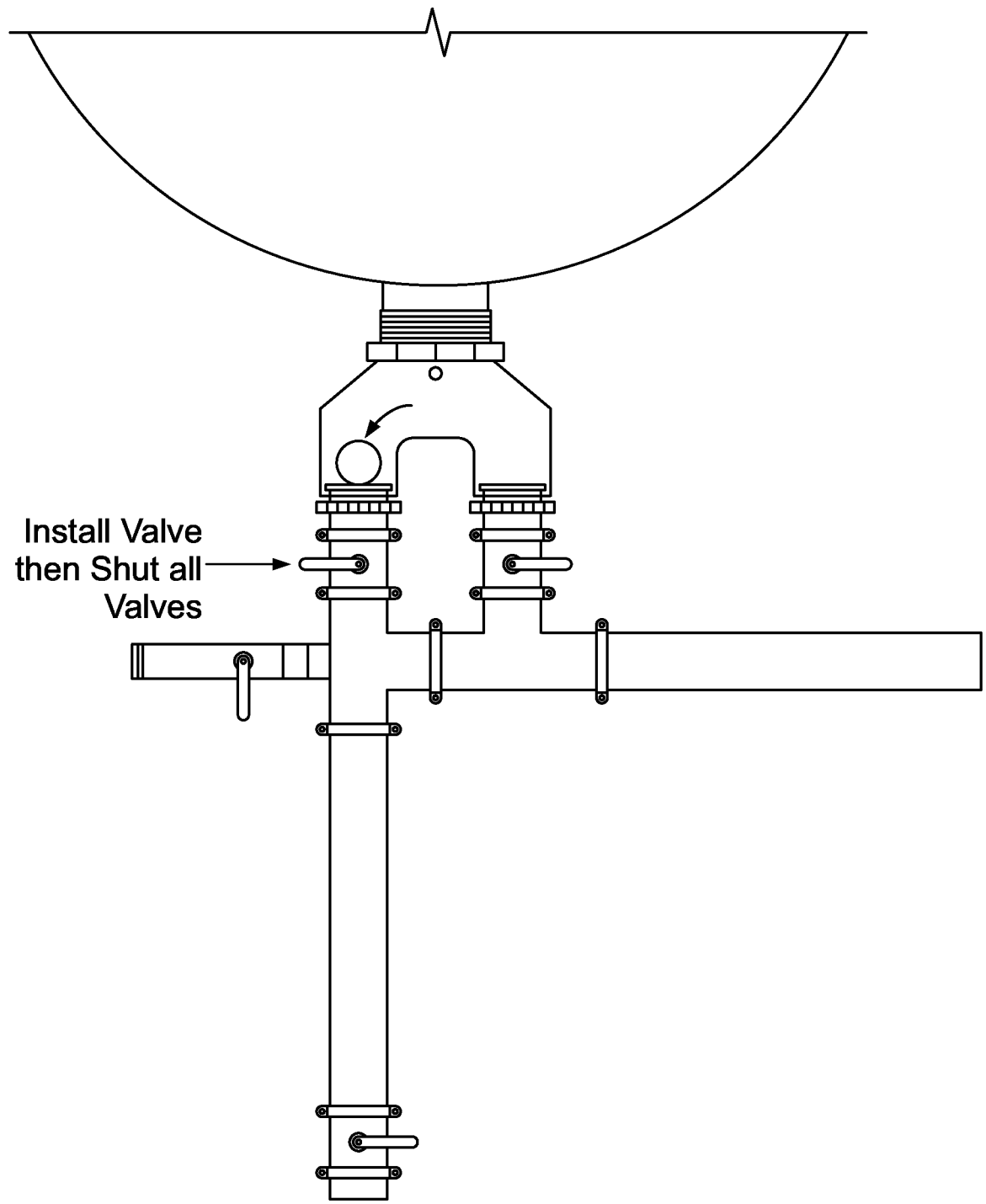
FIG. 8 illustrates a six step of the holder of the present invention.

FIG. 8 illustrates the sixth step and illustrates that a new first shutoff valve 127 is installed. The same procedure may be followed to replace any of the valves or passageways.

Figure 9:
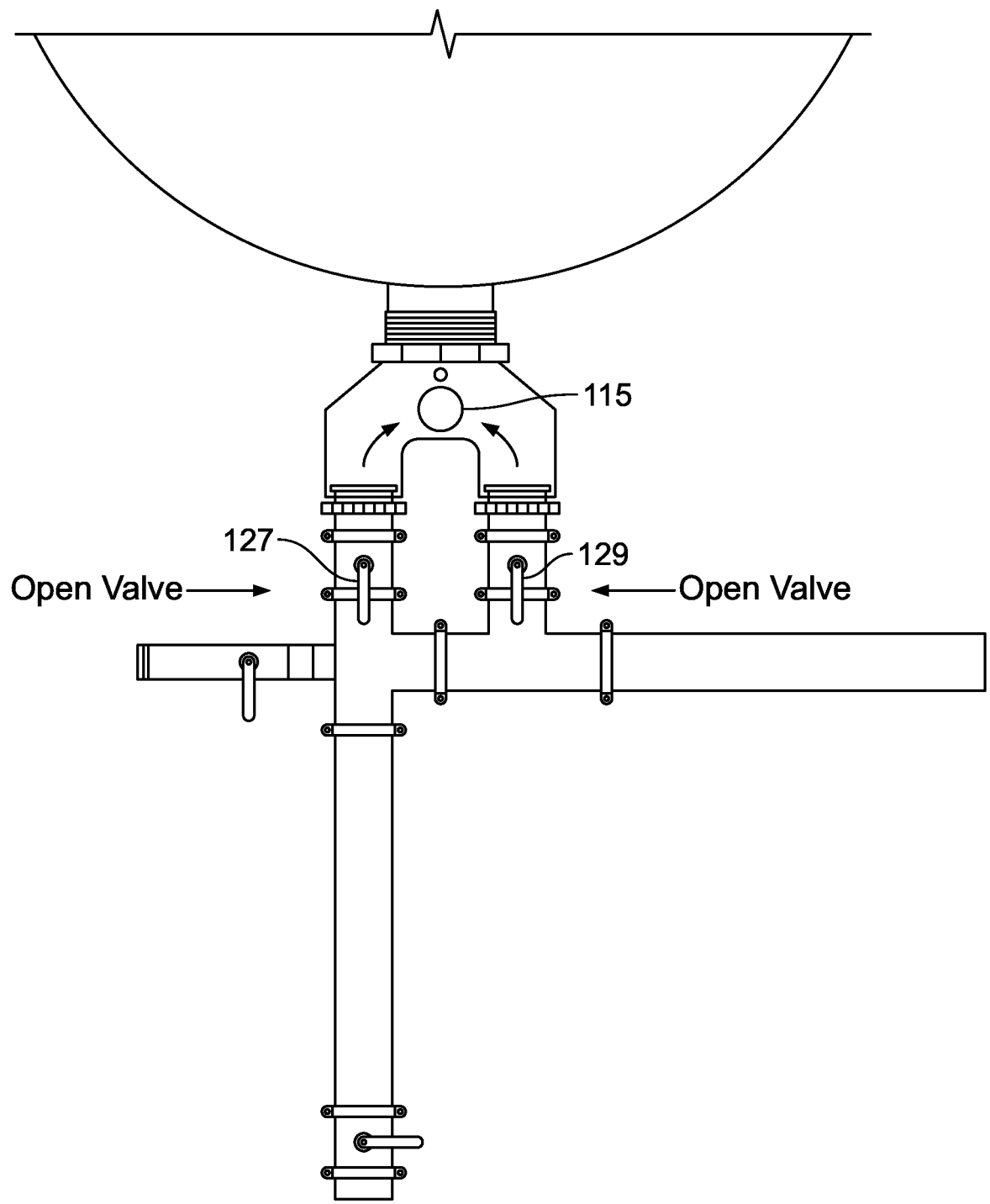
FIG. 9 illustrates a seven step of the holder of the present invention.

FIG. 9 illustrates the seventh step and illustrates that the first shutoff valve 127 and the second shutoff valve 129 are opened in order to release the control ball 115 to a position where both the first passageway 127 and the second passageway 129 are open.

Figure 10:
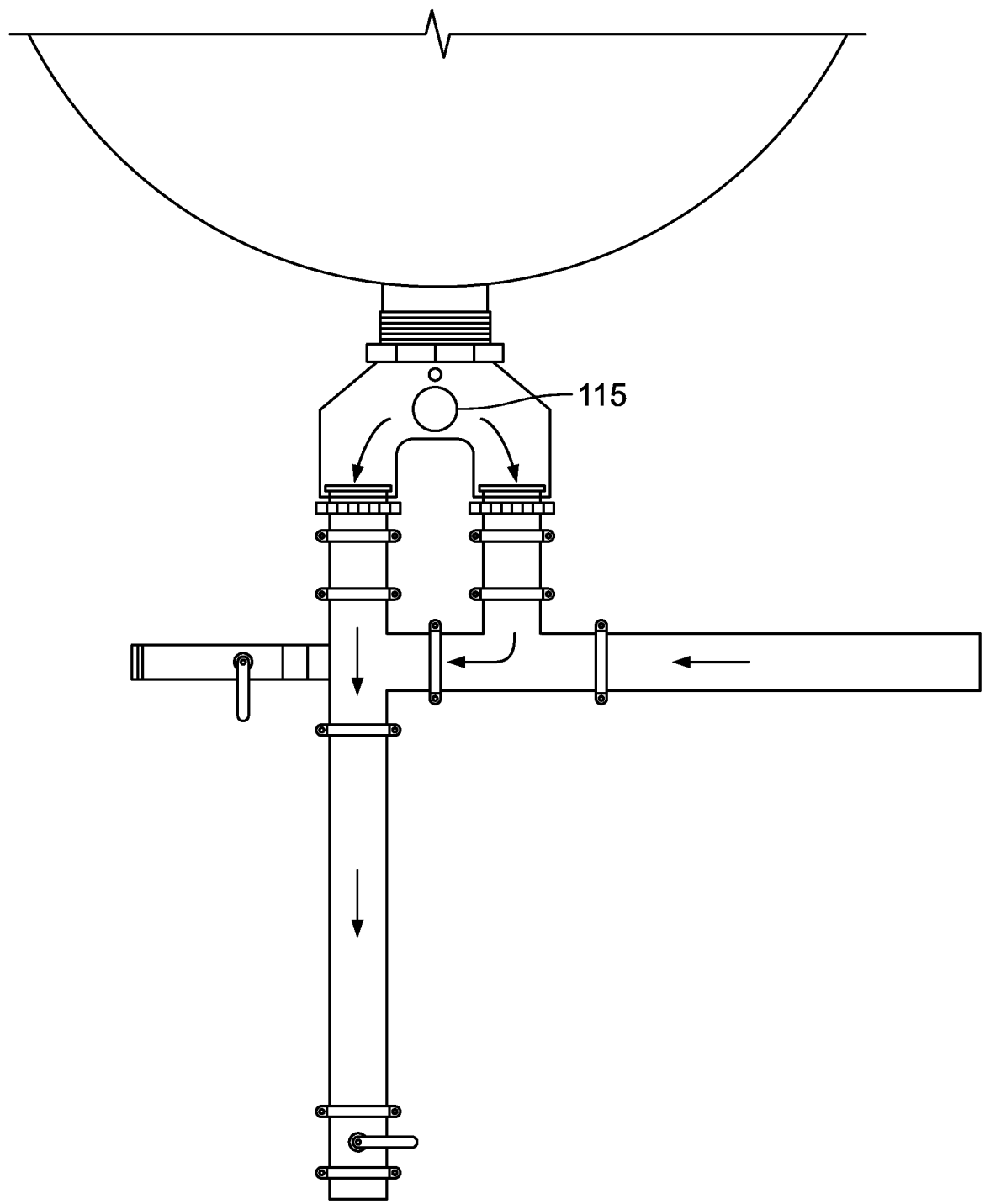
FIG. 10 illustrates an eighth step of the holder of the present invention.

FIG. 10 illustrates the eighth step and illustrates that the first shutoff valve 127, the second shutoff valve 129 and the third shutoff valve 128 are opened to allow the tank 103 to drain if desired.

Figure 11:
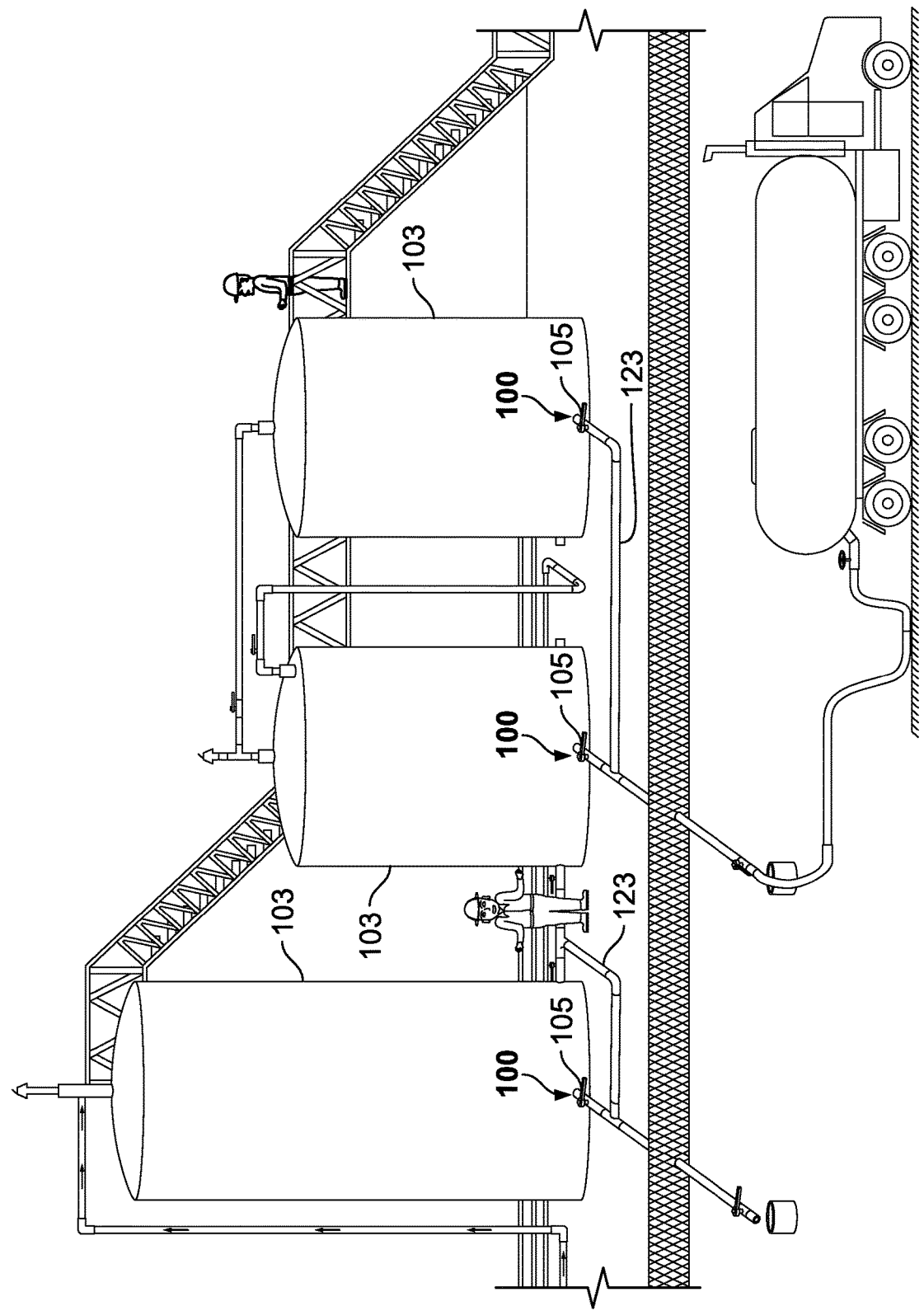
FIG. 11 illustrates a perspective view of the use of the present invention with multiple tanks.

FIG. 11 illustrates a multitude of tanks 103 which may be an oil tank, a water tank or other types of tanks. Each of the tanks 103 may be connected to a safety flow obstruction holder 100 which may be represented by a single shut off valve but may include all the features shown in FIG. 1 and FIG. 2. The safety flow obstruction holder 100 may be connected to an adjacent safety flow obstruction holder 100 by the connecting passageway 123 and may be connected to the respective tanks 103 by the supply passageway 105. The safety flow obstruction holder 100 may drain the fluid by the first drain passageway 121 (which may be optional).

Figure 14:
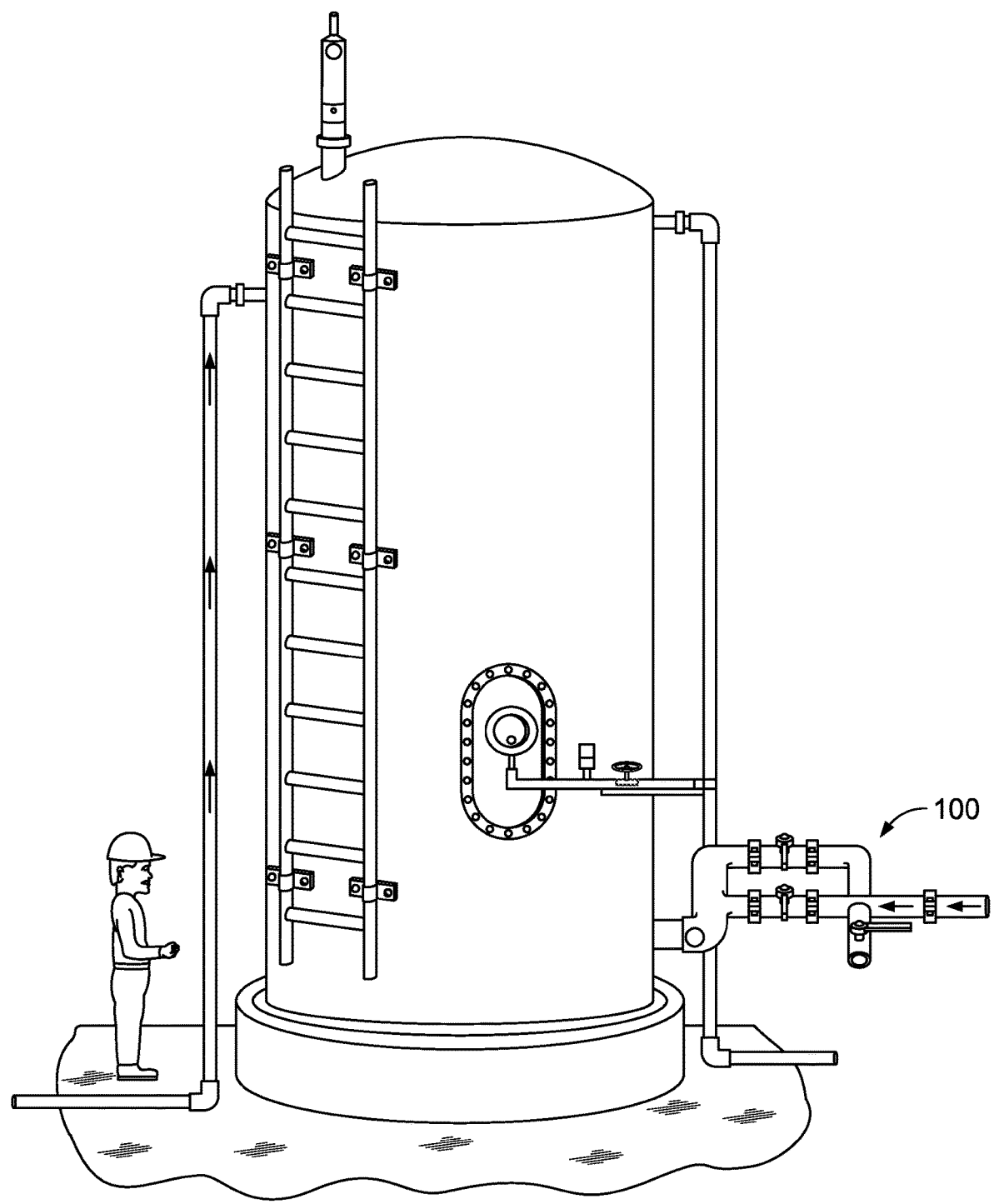
FIG. 14 illustrates a perspective view of the present invention.

FIG. 14 illustrates the safety flow obstruction holder 100 being applied and connected to a oil heater or alternatively an oil tester.

Figure 15:
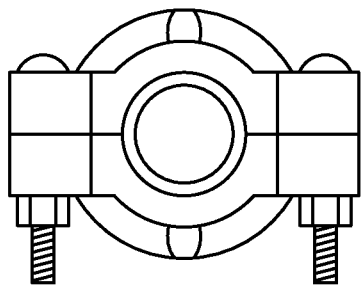
FIG. 15 illustrates an end view of a clamp of the present invention.

FIG. 15 illustrates an end view of the clamp of the present invention.

Figure 16:
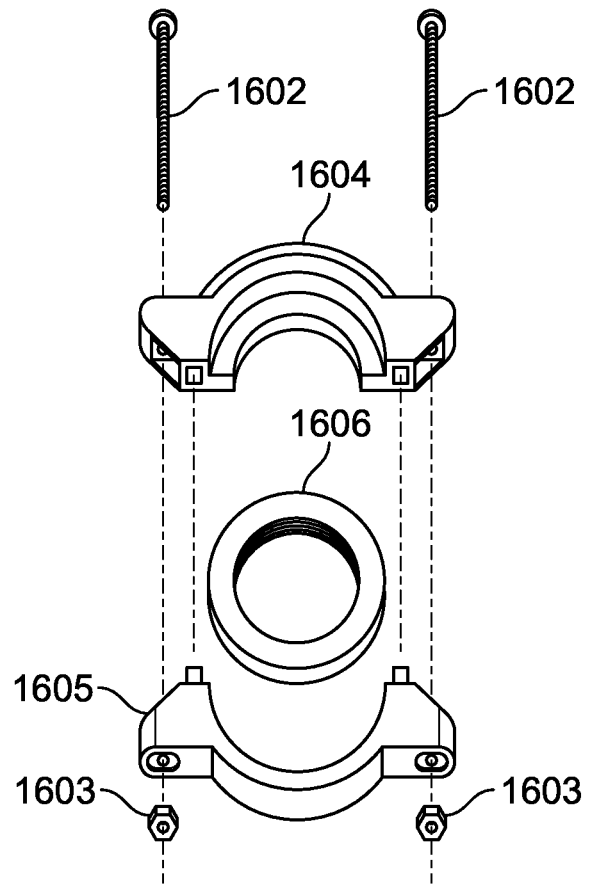
FIG. 16 illustrates an exploded view of the clamp of the present invention.

FIG. 16 illustrates an exploded view of the clamp 1600 which may include a pair of opposing bolts 1602 to cooperate with fasteners 1603, a an upper clamp member 1604, and lower clamp member 1605 and a gasket 1606 to cooperate with the upper clamp member 1604 and the lower clamp member 1605.

Figure 17:
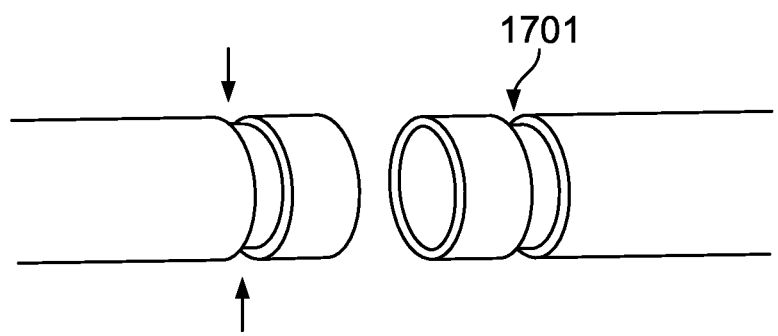
FIG. 17 illustrates a pipe/passageway of the present invention.

FIG. 17 illustrates a pipe/passageway which may include a groove 1701 to cooperate with the gasket 1606.

Figures 18, 19:
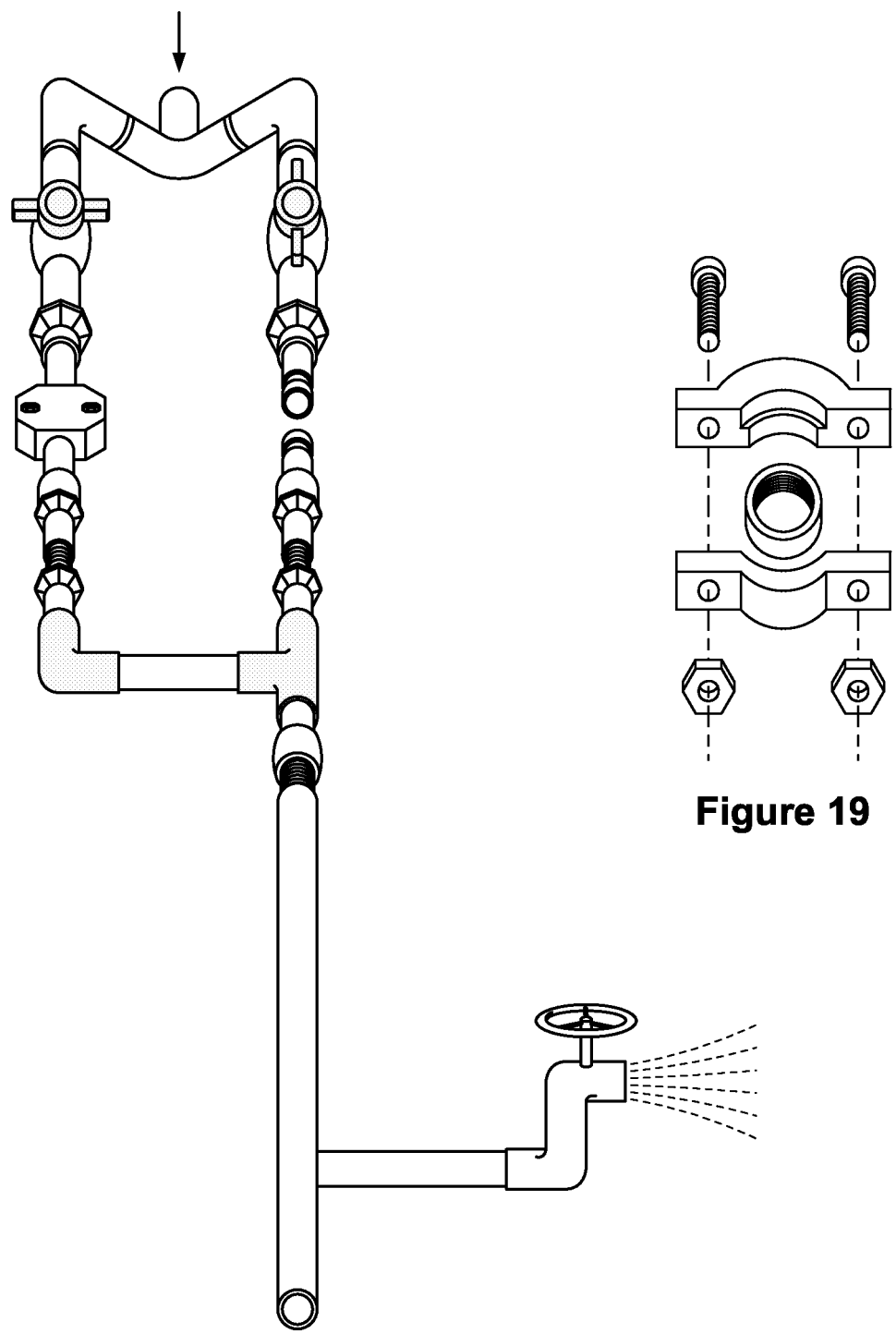
FIG. 18 illustrates a holder of the present invention for use in a home or dwelling.
FIG. 19 illustrates an exploded view of a clamp.

FIG. 18 illustrates a holder of the present invention to be used in a home or dwelling.

FIG. 19 illustrates an exploded view of a clamp.

Figure 20:
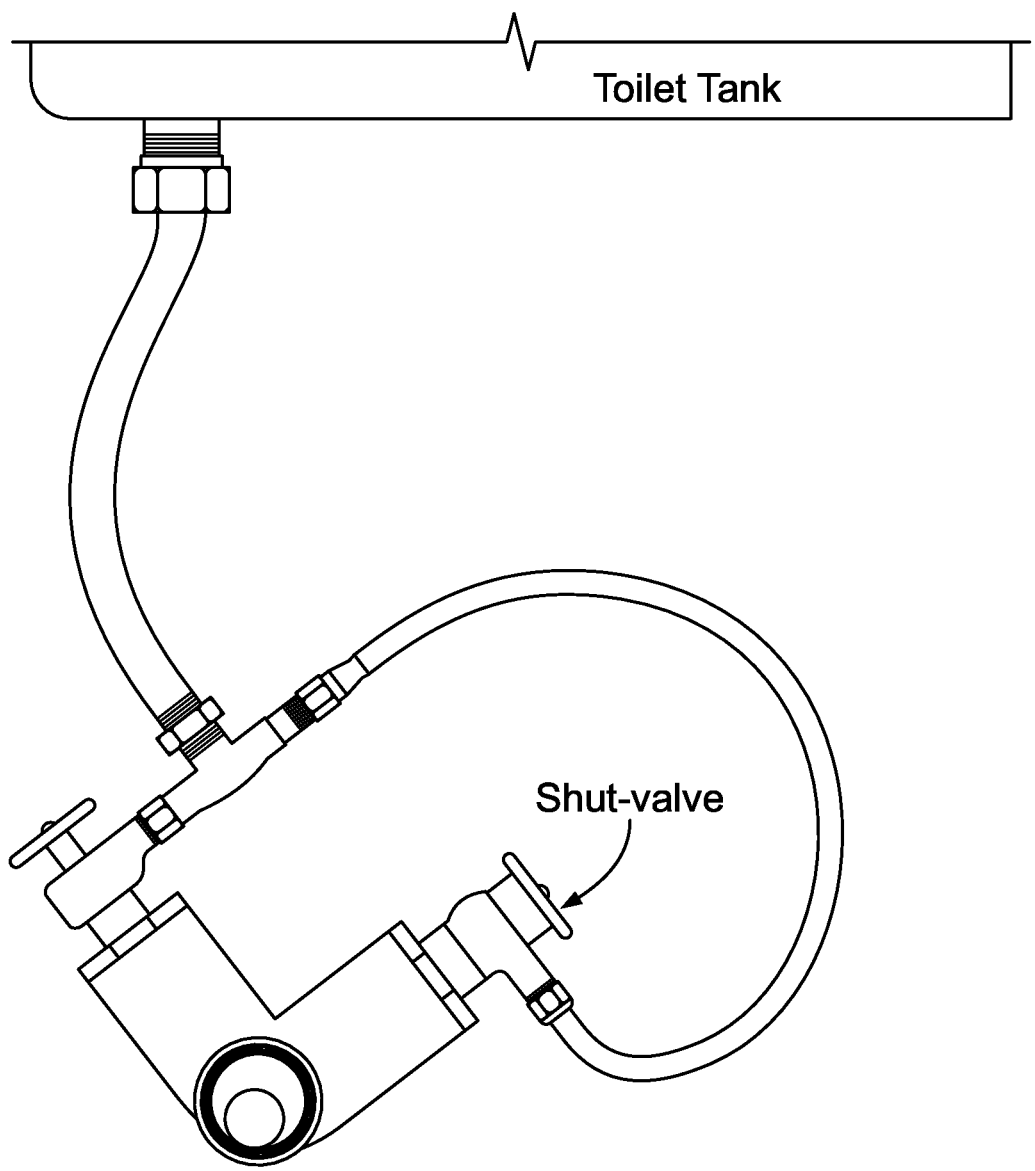
FIG. 20 illustrates another embodiment of the present invention.

FIG. 20 illustrates that the safety flow obstruction holder is connected to a toilet tank within a dwelling.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A safety flow obstruction holder for connecting to a tank for storing a liquid, comprising:
    a supply passageway for connecting to the tank;
    a ball valve for connecting to the supply passageway;
    a first drainage passageway for connecting to the ball valve;
    a second drainage passageway for connecting to the ball valve and being connected in parallel to the first drainage passageway;
    a connecting passageway to connect the first drainage passageway to the second drainage passageway to allow the liquid to flow between the first drainage passageway and the second drainage passageway;
    a first shut off valve having a first seat to selectively shut off the first drainage passageway; and
    a second shutoff valve having a second seat being closed to shut off the second drainage passageway to prevent the flow of the liquid in the second drainage passageway;
    a single ball only to selectly engage the first shut off valve to shut off the first drainage passageway; wherein the connecting passageway is positioned downstream of the first shut off valve and is position downstream of the second shut off valve.

2. A safety flow obstruction holder for connecting to a tank for storing a liquid as in claim 1 wherein the safety flow obstruction holder includes a third shutoff valve positioned within the first drainage passageway.

3. A safety flow obstruction holder for connecting to a tank for storing a liquid as in claim 1, wherein the safety flow obstruction holder is connected to a oil tank.

4. A safety flow obstruction holder for connecting to a tank for storing a liquid as in claim 1, wherein the safety flow obstruction holder is connected to a water tank.

5. A safety flow obstruction holder for connecting to a tank for storing a liquid as in claim 1, wherein the safety flow obstruction holder is connected to a water tank and an oil tank.

6. A safety flow obstruction holder for connecting to a tank for storing a liquid as in claim 1, wherein the safety flow obstruction holder is connected to an oil heater.

7. A safety flow obstruction holder for connecting to a tank for storing a liquid as in claim 1, wherein the safety flow obstruction holder is connected to a toilet.

* * * * *